(12) United States Patent
Garimella et al.

(10) Patent No.: US 11,993,275 B2
(45) Date of Patent: May 28, 2024

(54) ENGINE FRICTION MONITOR

(71) Applicant: Cummins Inc., Columbus, IN (US)

(72) Inventors: Phanindra V. Garimella, Bloomington, IN (US); James Ryan Hyslop, Columbus, IN (US); Venkatramanan Jayaraman, Greenwood, IN (US); Pallav Pathak, Columbus, IN (US); Michael Justin Tammen, Greenwood, IN (US); Patrick J. Shook, Franklin, IN (US); Randall J. Johnson, Columbus, IN (US); Travis Alva Anderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 565 days.

(21) Appl. No.: 17/026,699

(22) Filed: Sep. 21, 2020

(65) Prior Publication Data

US 2021/0001871 A1    Jan. 7, 2021

Related U.S. Application Data

(63) Continuation of application No. PCT/US2019/025385, filed on Apr. 2, 2019.

(60) Provisional application No. 62/651,469, filed on Apr. 2, 2018.

(51) Int. Cl.
*B60W 50/038* (2012.01)
*B60W 20/50* (2016.01)

(52) U.S. Cl.
CPC .......... *B60W 50/038* (2013.01); *B60W 20/50* (2013.01); *B60W 2710/083* (2013.01)

(58) Field of Classification Search
CPC .............. B60W 50/038; B60W 20/50; B60W 2710/083; F02D 2200/1002; F02D 2200/1006; F02D 41/22
See application file for complete search history.

(56) References Cited

U.S. PATENT DOCUMENTS

| | | | |
|---|---|---|---|
| 6,188,951 B1 | 2/2001 | Beechie et al. | |
| 6,704,639 B2 | 3/2004 | Amano | |
| 6,714,852 B1 | 3/2004 | Lorenz et al. | |
| 7,324,888 B1 | 1/2008 | Stotsky | |
| 7,844,404 B2 | 11/2010 | Ling et al. | |
| 8,437,927 B2 | 5/2013 | Brennan et al. | |
| 9,014,918 B2 | 4/2015 | Hagen et al. | |
| 2006/0194670 A1 | 8/2006 | Heap et al. | |
| 2009/0306866 A1 | 12/2009 | Malikopoulos | |
| 2010/0332096 A1* | 12/2010 | Hanzawa | B60K 31/047 701/70 |
| 2011/0060509 A1 | 3/2011 | Otanez et al. | |
| 2012/0253631 A1 | 10/2012 | Li et al. | |
| 2012/0324989 A1 | 12/2012 | Patel et al. | |

(Continued)

OTHER PUBLICATIONS

Search Report and Written Opinion, PCT Appln. No. PCT/US2019/025385, 8 pgs, dated Jun. 17, 2019.

(Continued)

*Primary Examiner* — Kira Nguyen
(74) *Attorney, Agent, or Firm* — Taft, Stettinius & Hollister LLP (57) ABSTRACT

An engine friction monitor uses commanded torque and measured torque to provide a prognostic feature to identify failure modes of an engine that causes the engine from delivering the commanded torque.

20 Claims, 7 Drawing Sheets

(56) References Cited

U.S. PATENT DOCUMENTS

| | | | |
|---|---|---|---|
| 2013/0184966 A1 | 7/2013 | Lockwood et al. | |
| 2014/0121994 A1* | 5/2014 | Jean | G06F 15/00 |
| | | | 702/27 |
| 2015/0114345 A1 | 4/2015 | Lockwood et al. | |
| 2015/0298684 A1* | 10/2015 | Schwartz | B60W 40/02 |
| | | | 180/65.265 |
| 2016/0178464 A1 | 6/2016 | Burns et al. | |
| 2016/0237924 A1 | 8/2016 | Azizou | |
| 2019/0234971 A1* | 8/2019 | Jean | F02D 41/22 |

OTHER PUBLICATIONS

European Extended Search Report, EP Appln. No. 19781246.4, dated Oct. 28, 2021, 8 pgs.
First Office Action issued by the China National Intellectual Property Administration (English Translation Attached), dated Feb. 7, 2023, for related Chinese Application No. 201980023535.1; 7 pg.

* cited by examiner

ENGINE FRICTION MONITOR

CROSS-REFERENCE TO RELATED APPLICATIONS

The present application is a continuation of International Patent Application No. PCT/US19/25385 filed on Apr. 2, 2019, which claims the benefit of the filing date of U.S. Provisional Application Ser. No. 62/651,469 filed on Apr. 2, 2018, which are incorporated herein by reference.

TECHNICAL FIELD

The present disclosure relates generally to an identification of a potential or impending failure of an engine and/or one or more engine components.

BACKGROUND

An engine will experience progressive damage due to various failure modes including, but not limited to, cylinder block damage, bearing failures (e.g., possibly related to crankshaft pin grinder burn), component wear and drift (e.g., fuel system components) and alternator bearing failures. Thus, there is a need for a mechanism that utilizes relevant information to help with identification of a possibility of an impending engine failure.

SUMMARY

The present disclosure describes an engine friction monitor that uses commanded torque and measured torque to provide a prognostic feature to identify potential failure of an engine and/or its components that causes the engine to be prevented from delivering the commanded torque.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The present disclosure is applicable to any engine capable of converting various types of energy into mechanical force and motion, and further applicable to any engine control module for commanding a rotational force (i.e., torque) to be produced by an engine. The present disclosure describes an engine friction monitor apparatus, system, method and technique that uses commanded torque and measured torque, rate of change of torque, pattern recognition, and classification methods to provide a prognostic feature to identify potential failure of an engine that causes the engine from delivering the commanded torque due to an increase in friction on the engine components.

Figure 1:
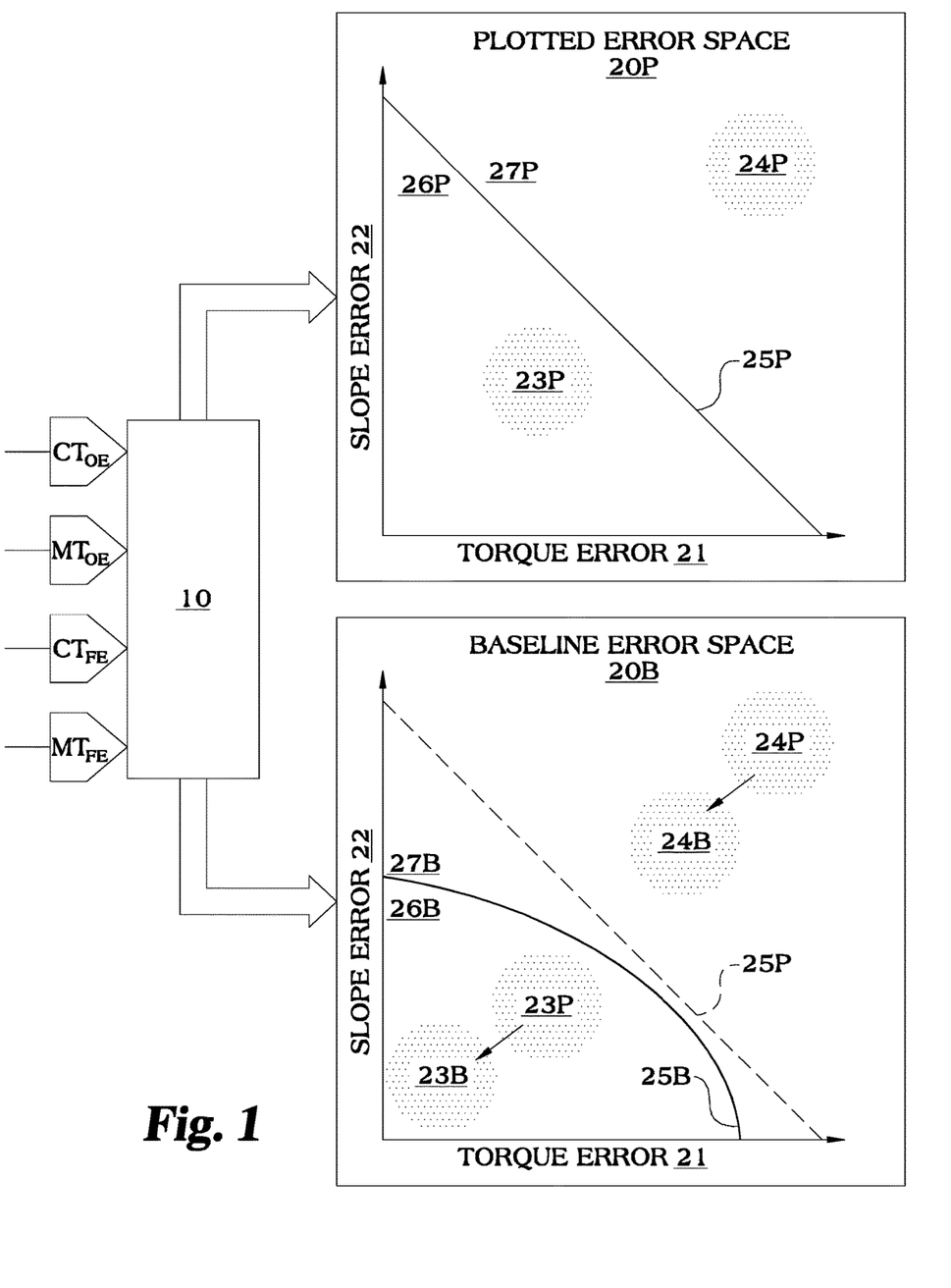
FIG. 1 illustrates a block diagram of an engine friction learning module of the present disclosure.

FIG. 1 shows an engine friction learning module 10 of the present disclosure for baselining to learn behavior of a nominal, good engine system and provide confidence in the baseline models. Engine friction module 10 may provide data filtering and selection to extract the correct information to make decisions and classify the data to determine if the system is operating in a "good" condition or "bad" condition. As used herein, a "good" condition indicates a torque deviation of the engine from a commanded torque that is within one or more predetermined thresholds, i.e. that the engine friction amount is acceptable or within tolerances. A "bad" system indicates a torque deviation that is more than one or more thresholds indicative of an excessive friction condition for one or more components of the engine, i.e. that the engine friction amount is unacceptable or outside tolerances.

Engine friction learning module 10 can include, for example, a computer module or circuit configured for processing a commanded torque $CT_{OE}$ and a measured torque $MT_{OE}$ from operational engine(s) and further process a commanded torque $CT_{FE}$ and a measured torque $MT_{FE}$ from failed engine(s) to generate a plotted error space 20P. This data is used to learn the plotted error space 20P, which is modified with subsequent data to learn a baseline error space 20B.

Plotted error space 20P is defined by a torque error axis 21 and a slope error axis 22. For the present disclosure, a torque error is a differential between a commanded torque and a measured torque of a particular engine, such as, for this present disclosure, a differential between commanded torque $CT_{OE}$ and measured torque $MT_{OE}$ from an operational engine or a differential between commanded torque $CT_{FE}$ and measured torque $MT_{FE}$ from a failed engine. Slope error is determined in response to a differential between a rate of change of the commanded torque and a rate of change of the measured torque. Plotted error space 20P includes a nominal threshold boundary 25P dividing plotted error space 20P into a "good" torque area 26P of plotted torque errors 23P between commanded torque $CT_{OE}$ and measured torque $MT_{OE}$ from operational engines and a "bad" torque area 27P of plotted torque errors 24P between commanded torque $CT_{FE}$ and measured torque $MT_{FE}$ from failed engines.

For an engine, there are a number of factors that could cause the torque errors including, but not limited to, component wear and drift, variability in a fuel system, and variation in alternator efficiency. Plotted error space 20P trains the engine friction learning module 10 to learn how the nominal system performs and produce a nominal threshold boundary based on initial data.

Figure 2A:
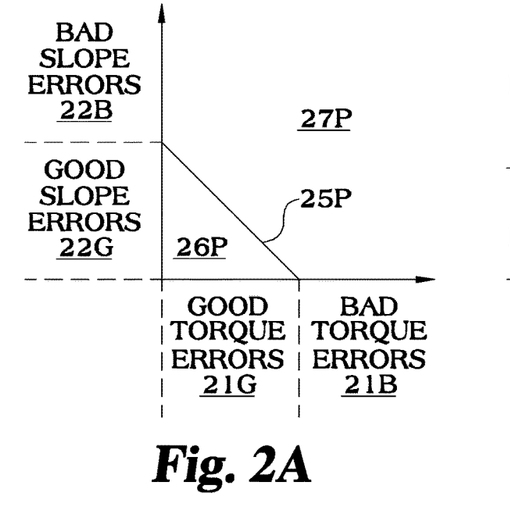
FIGS. 2A-2B illustrates a development of a baseline error space from a nominal error space in accordance with the present disclosure.

In FIG. 2A, torque errors between commanded torque $CT_{OE}$ and measured torque $MT_{OE}$ are classified as good torque errors 21G below nominal threshold boundary 25P on torque error axis 21 from operational engines. Torque errors between commanded torque $CT_{FE}$ and measured torque $MT_{FE}$ from failed engines above nominal threshold boundary 25P on torque error axis 21 are classified as bad torque errors 21B. Slope or rate of change errors are initially classified as good slope errors 22G below nominal threshold boundary 25P on slope error axis 22 from operational engines, and bad slope errors 22B from failed engines if above nominal threshold boundary 25P on slope error axis 22.

Referring back to FIG. 1, baseline error space 20B includes plotted good torque errors 23P and plotted bad torque errors 24P that are baselined relative to an origin of plotted error space 20P to identify the nominal or initial behavior of the engine represented by nominal threshold boundary 25P. As more and more plotted good torque errors 23P and plotted bad torque errors 24P are baselined, engine friction learning module 10 computes a cumulative sum of the distances of the points from the origin of plotted error space 20P. This ensures points that are further away from the nominal threshold boundary 25P and are added to the "bad" area get weighted higher to provide appropriate weight to failures that cause significant impact on increased friction. As a result, the plotted nominal threshold boundary 25P evolves into baseline threshold boundary 25B over time as more data is collected.

Alternatives to baselining plotted error space 20P based on a computation of a distance of each point from the origin are also contemplated. For example, other methods for supervised learning and classification may be applied to train nominal threshold boundary 25P (e.g., a support vector machine) to learn a baseline threshold boundary 25B.

Figure 2B:
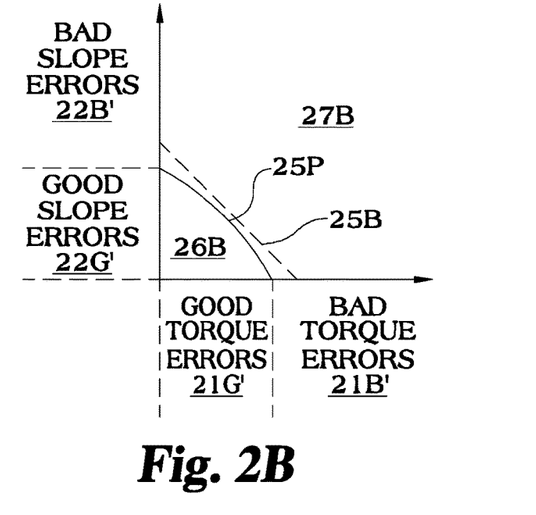

Baseline torque error space 20B includes good torque errors 23B below baseline threshold boundary 25B and bad torque errors 24B above baseline threshold boundary 25B. Baseline threshold boundary 25B divides baseline torque error space 20B into good torque area 26B and bad torque area 27B. In FIG. 2B, torque errors are initially classified as good torque errors 21G' below baseline threshold boundary 25B on torque error axis 21 from operational engines, and bad torque errors 21B' from failed engines above baseline threshold boundary 25B on torque error axis 21. Slope or rate of change errors are initially classified as good slope errors 22G' below baseline threshold boundary 25B on slope error axis 22 from operational engines, and bad slope errors 22B' from failed engines above baseline threshold boundary 25B on slope error axis 22.

Figure 3:
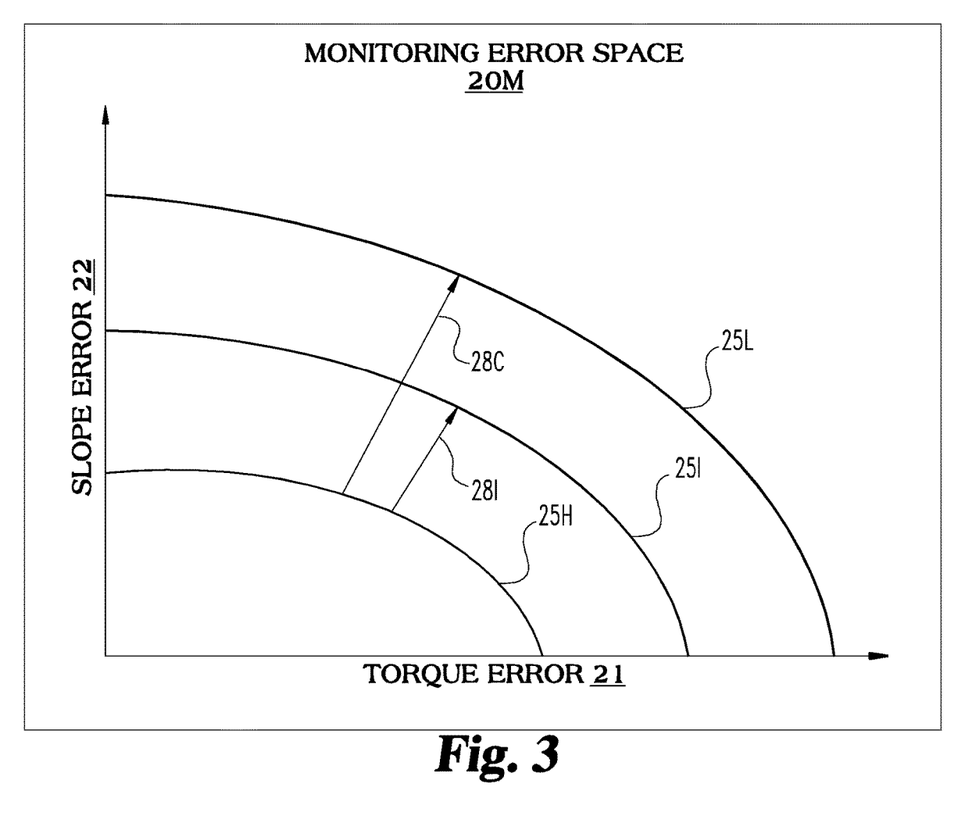
FIG. 3 is an exemplary monitoring error space in accordance with the present disclosure.

Engine friction learning module 10 outputs a monitoring error space 20M in FIG. 3 for monitoring an engine in real-time to thereby identify any failure modes of the engine that causes the engine from delivering commanded torque. Monitoring error space 20M is defined by torque error axis 21 and slope error axis 22 and includes a monitoring baseline threshold boundary 25H, 25I, or 25L to divide monitoring error space 20M into a first, good torque area below the monitoring baseline threshold boundary 25H, 25I, or 25L and a second, bad torque area above monitoring baseline threshold boundary 25H, 25I, or 25L. In an embodiment, baseline threshold boundary 25B (FIG. 1) serves as the initial high confidence monitoring threshold boundary 25H for dividing the first and second torque areas and can be shifted based on a change in a confidence level of the torque data.

In an embodiment, engine friction learning module 10 establishes a confidence level in engine conditions being utilized for learning including, but not limited to, how much torque data is being provided and a degree of variation of the torque data. As engine friction learning module 10 trains nominal threshold boundary 25P as previously described, engine friction learning module 10 can establish a low confidence threshold boundary 25L reflective of a low confidence level in the conditions being conducive for predicting the impact of friction on the torque output, an intermediate threshold boundary 25I reflective of an intermediate confidence level in the engine conditions being conducive for prediction, and a high confidence threshold boundary 25H reflective of a high confidence level in the engine conditions being conducive for predicting the impact of friction on the torque output. Engine friction learning module 10 may thereby control the classification of data as "good" or "bad" based on the assigned confidence level for the predictive value of the data that is collected.

For example, as shown in FIG. 3, subsequent to a key on of an engine, engine friction learning module 10 may stay at high confidence threshold boundary 25H until such time the engine experiences operating conditions that provide less confidence being utilized for learning or predicting the impact due to engine friction (due to lack of information, too much variation, movement to a different load point, a key off event, etc.), the threshold boundary can transition 28I to intermediate confidence threshold boundary 25I. The confidence level can also transition 28C to a low confidence threshold boundary 25L depending on the operating conditions. At low confidence threshold boundary 25L, the learning can be reset through a service tool if needed. The resetting of the confidence level allows the thresholds to be revisited and ensure more robustness in predictions and reduce the impact of uncertainty and new conditions on the prediction method.

Figure 4:
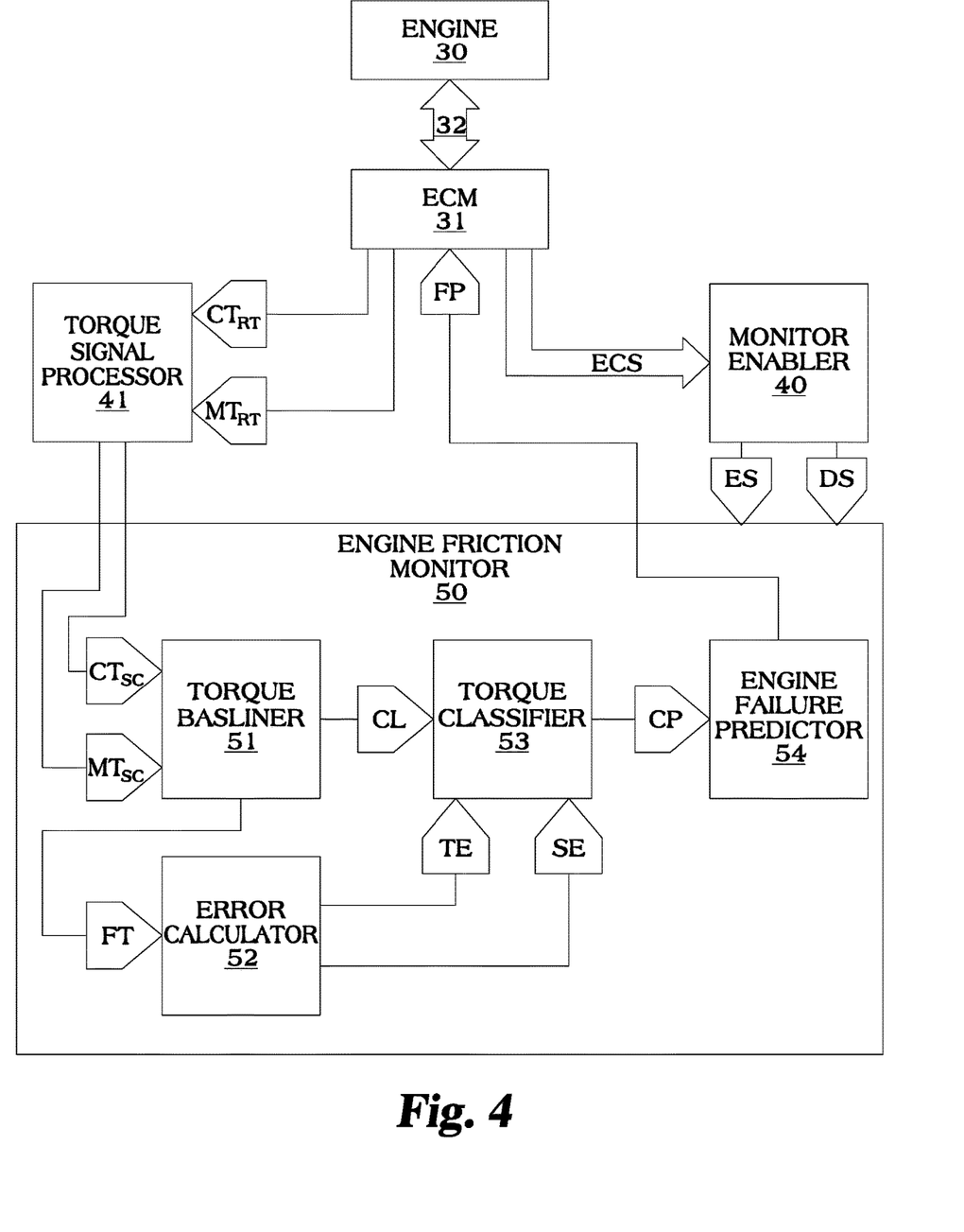
FIG. 4 is a block diagram of an engine friction monitoring system of the present disclosure.
Figure 5:
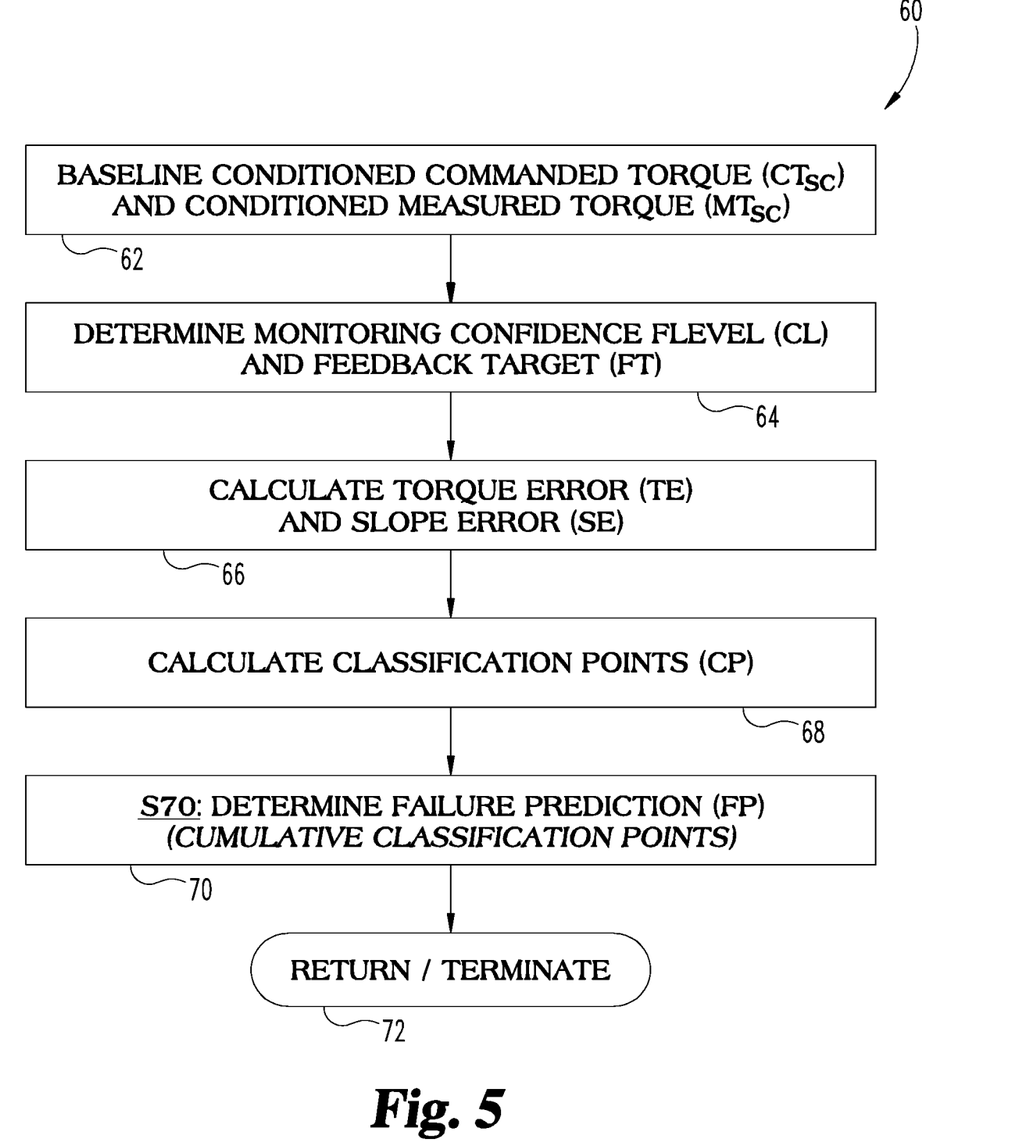
FIG. 5 is a flow diagram of one embodiment of an engine friction monitoring method of the present disclosure.

With reference to FIGS. 4 and 5, an engine friction monitor 50 of the present disclosure executes an engine friction monitoring method or procedure 60 embodied by a flow diagram. In accordance with the method, engine friction monitor 50 processes torque of an engine 30 commanded and measured by ECM 31 to identify potential failure modes of engine 30 that causes the engine from being prevented in delivering the commanded torque.

Engine 30 may be any type of engine including, but not limited to, an internal combustion engine. For example, engine 30 can be a gasoline engine, diesel engine, natural gas engine, dual fuel engine, or any other type of engine known in the art. Engine 30 can be employed in stationary applications, such as in powering a generator set, or in powering a vehicle, pump, or other equipment.

Engine control module (ECM) 31, monitor enabler 40, torque signal processor 41, and/or engine friction monitor 50 can be implemented in hardware as one or more computer processing modules, circuits, and/or as instructions encoded on computer readable medium, and may be distributed across various hardware, computer processor or controller components or combined in a single controller or computer processor.

A monitor enabler 40 receives enable condition signals ECS from ECM 31 to communicate an enable signal ES or a disable signal DS to engine friction monitor 50. Enable condition signals include, but are not limited to, a signal indicative of whether a circuit breaker is closed or open, whether a load request is present, an engine speed signal, an engine temperature condition, or any other condition that may be suitably required for monitoring of engine friction.

A torque signal processor 41 is provided to receive commanded torque $CT_{RT}$ and measured torque $MT_{RT}$ in real-time from ECM 31 and applies a transient filtering of the torque to thereby communicate a conditioned commanded torque signal $CT_{SC}$ and conditioned measured torque signal $MT_{SC}$ to another module or circuit, such as a torque baseliner 51 of an enabled engine friction monitor 50. Engine friction monitor 50 also includes circuits or modules such as an error calculator 52 and a torque classifier 53 in communication with torque baseliner 51. Error calculator 52 determines a torque error TE and slope error SE from torque feedback target FT. Torque classifier 53 outputs classification points CP for the current operating conditions in response to the confidence level CL from torque baseliner 51 and the torque error TE and slope error SE from error calculator 52. An engine failure predictor 54 includes a module or circuit that receives the operating classification points CP and outputs a failure prediction FP to ECM 31. ECM 31 can then accumulate the indicators and take no action, provide an output such as a warning or alerts to have the engine serviced, and/or derate the engine completely or partially to prevent catastrophic damage or to limit the potential for damage depending on the failure prediction.

A flow diagram of an embodiment of a procedure 60 for operation by engine friction monitor 50 is shown in FIG. 5. Procedure 60 includes an operation 62 in which torque baseliner 51 baselines conditioned commanded torque signal $CT_{SC}$ and conditioned measured torque signal $MT_{SC}$ in accordance with the training of engine friction monitor 50 as previously described herein. At operation 64 of procedure 60, torque baseliner 51 determines a confidence level CL and feedback target FT from conditioned commanded torque signal $CT_{SC}$ and conditioned measured torque signal $MT_{SC}$.

An operation 66 of procedure 60 includes error calculator 52 calculating a torque error TE and slope error SE based on the feedback target FT. Torque classifier 53 plots torque error TE and slope error SE on monitoring error space 20M (FIG. 3) relative to a selected monitoring threshold boundary 25H, 25I, 25L to thereby calculate classification points CP at operation 68, which are accumulated to provide a failure prediction as will be further described herein in connection with FIGS. 6-8.

Procedure 60 continues at operation 70 which includes engine failure predictor 54 determining a failure prediction FP based on an accumulation of classification points as will be further described herein in connection with FIGS. 6-8. At operation 72, procedure 60 returns to operation 62 or terminates.

With reference to FIGS. 6-8, an accumulation of classification points within escalating indicator classification point buckets or caches 90-92 is illustrated for sequentially plotted classification points 80-83 relative to a high confidence threshold boundary 25H, an intermediate confidence threshold boundary 25I and a low confidence threshold boundary 25L, respectively. Point bucket 90 represents classification points relating to a first level of monitoring of engine 30, such that the number of "bad" classification points can be contained within point bucket 90 and only call for a cautious monitoring. Point bucket 91 represents classification points for a second level of monitoring of engine 30 due to the number of classification points classified as "bad" exceeding the capacity of point bucket 90. Point bucket 92 represents classification points for a third level of monitoring of engine 30, where the number of "bad" classification points exceed the capacity of point buckets 91 and 92, indicating a potential for failure. While three escalation buckets are illustrated in FIGS. 6-8, another embodiment contemplates five escalating point buckets are used. However, it should be understood that any number of monitoring escalation levels and classification point buckets can be used.

Figure 6A:
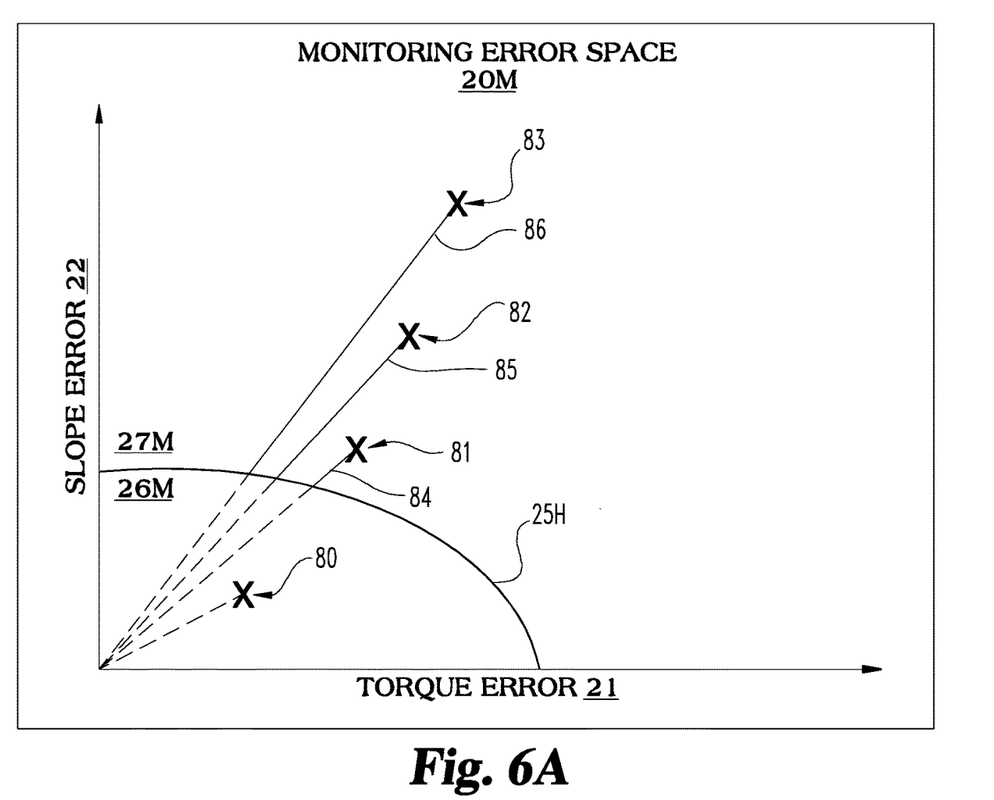
FIGS. 6A-6E is an exemplary engine failure prediction technique based on a high confidence threshold for the monitoring error space in accordance with the present disclosure.
Figure 6B:
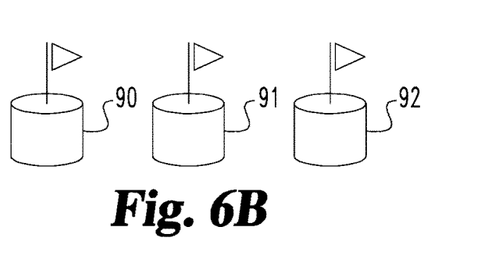
Figure 6C:
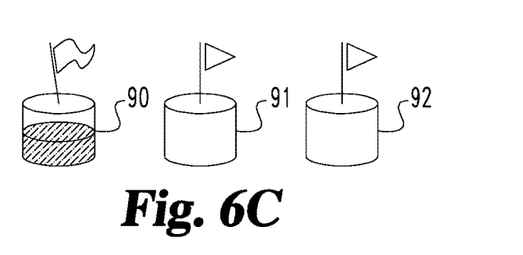

Referring to FIG. 6A, based on high confidence threshold boundary 25H, plotted classification point 80 is within good torque area 26M while plotted classification points 81-83 are within bad torque area 27M. Plotted classification point 80 represents zero (0) classification points and no classification points are added to any of the point buckets 90-92 as shown in FIG. 6B. Plotted classification point 81 represents non-zero classification points equal to or greater than a magnitude of a vector 84 extending from high confidence threshold boundary 25H to plotted classification point 81 where the non-zero classification points are added to point bucket 90 as shown in FIG. 6C. This addition can activate a caution or first level type of flag in the engine friction monitor 50 and/or ECM 30.

Figure 6D:
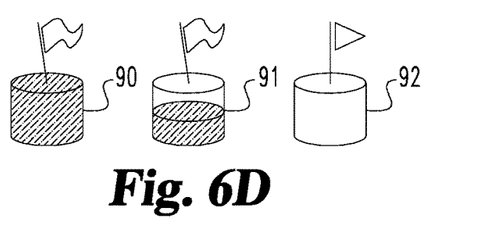
Figure 6E:
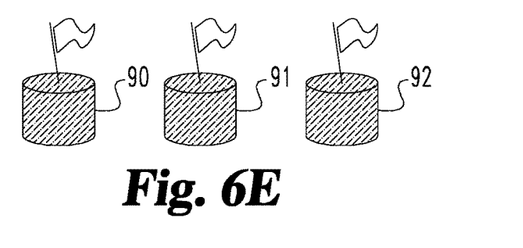

Plotted classification point 82 represents non-zero classification points equal to or greater than a magnitude of a vector 85 extending from high confidence threshold boundary 25H to plotted classification point 82 where the non-zero classification points are added to point buckets 90 and 91 as shown in FIG. 6D. This accumulation in the second bucket can activate a concerned or second level type of flag. Plotted classification point 83 represents non-zero classifications points equal to or greater than a magnitude of a vector 86 extending from high confidence threshold boundary 25H to plotted classification point 83 where the non-zero classification points are added to point buckets 91 and 92 as shown in FIG. 6E. This accumulation activates a failure prediction or third level flag or warning that is communicated to ECM 31 upon filling of point bucket 92.

Figure 7A:
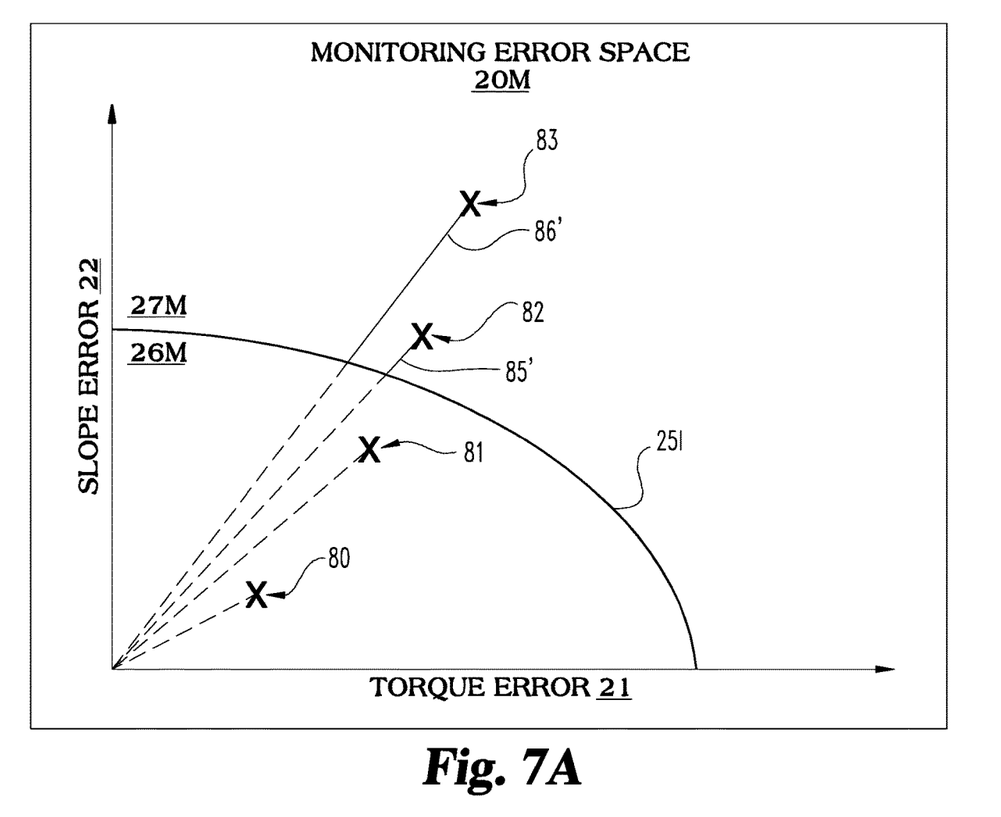
FIGS. 7A-7E is an exemplary engine failure prediction technique based on an intermediate confidence threshold for the monitoring error space in accordance with the present disclosure.
Figure 7B:
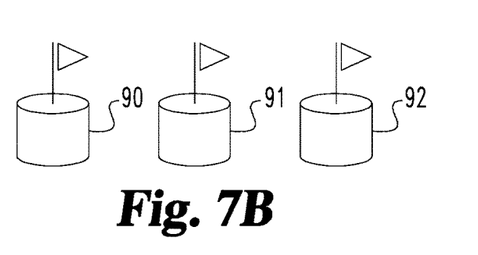
Figure 7C:
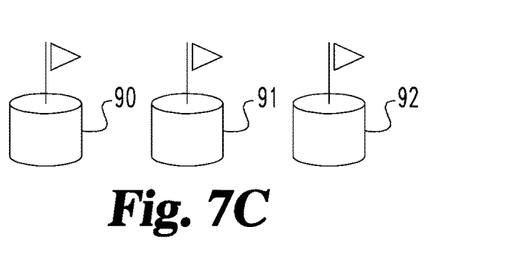

Referring to FIG. 7A, based on the intermediate confidence threshold boundary 25I, plotted classification points 80 and 81 are within good torque area 26M while plotted classification points 82 and 83 are within bad torque area 27M. Plotted classification point 80 represents zero classification points being added to point buckets 90-92 as shown in FIG. 7B. Plotted classification point 81 also represents zero classification points being added to point buckets 90-92 as shown in FIG. 7C.

Figure 7D:
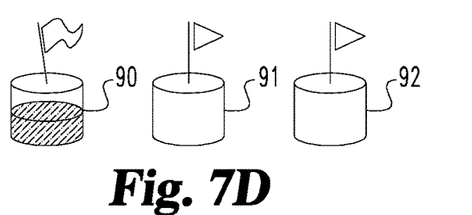
Figure 7E:
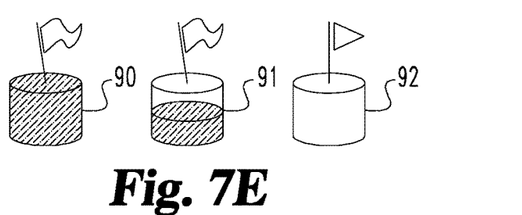

Plotted classification point 82 represents non-zero classifications points equal to a magnitude of a vector 85' extending from intermediate confidence threshold boundary 25I to plotted classification point 82 where the non-zero classification points are added to point bucket 90 as shown in FIG. 7D. This addition activates a cautious flag or first level of warning. Plotted classification point 83 represents non-zero classification points equal to a magnitude of a vector 86' from intermediate confidence threshold boundary 25I to plotted classification point 83 where the non-zero classification points are added to point buckets 90 and 91 as shown in FIG. 7E. This accumulation into point bucket 91 activates a concerned flag or second level of warning. However, the shift in the confidence level boundary from high to intermediate results in less accumulation of classification points that indicate a potential failure as compared to FIGS. 6A-6E, thus reducing false alarms regarding a potential failure.

Figure 8A:
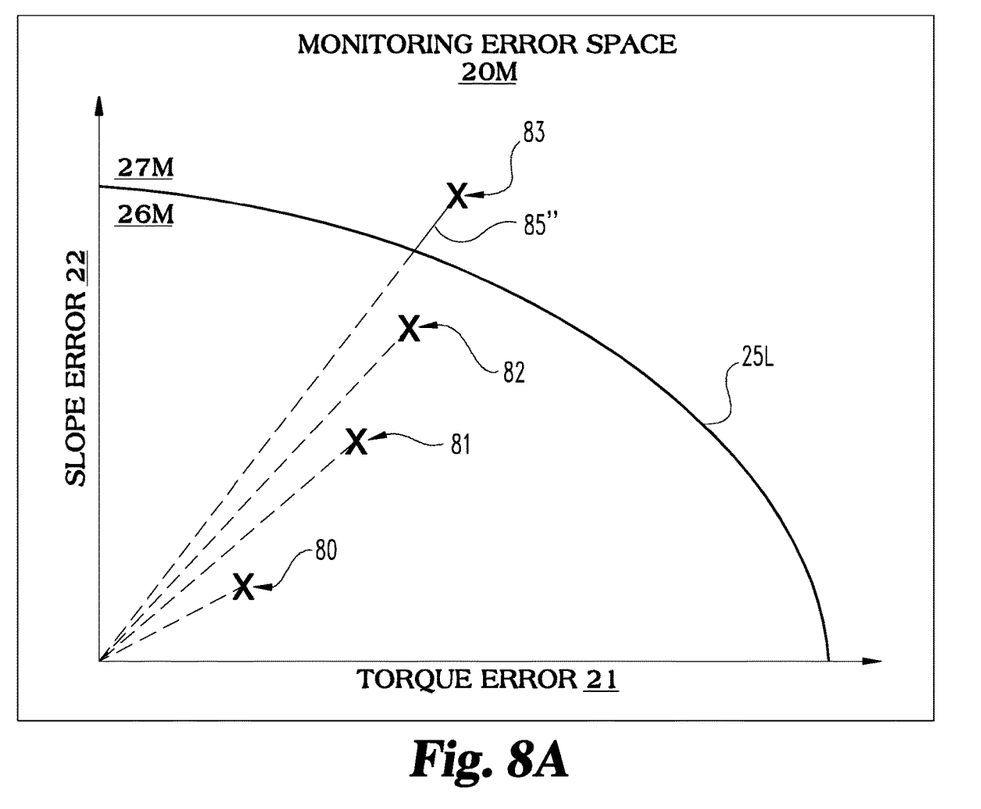
FIGS. 8A-8E is an exemplary engine failure prediction technique based on a low confidence threshold for the monitoring error space in accordance with the present disclosure.
Figure 8B:
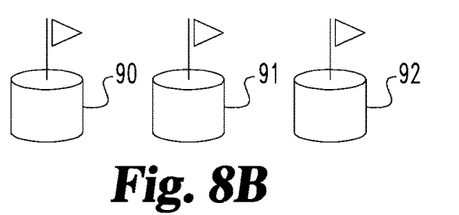
Figure 8C:
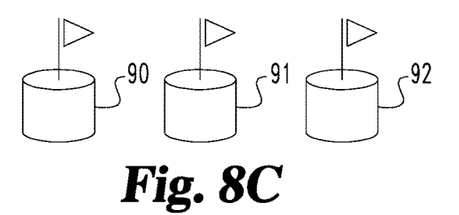
Figure 8D:
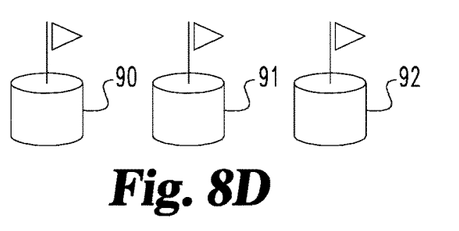
Figure 8E:
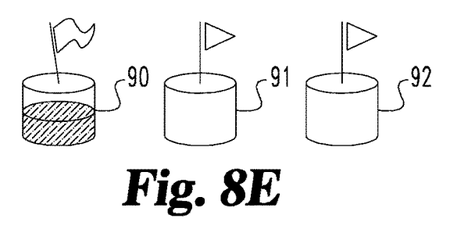

Referring to FIG. 8A, based on low confidence threshold boundary 25L, plotted classification points 80-82 are all within good torque area 26M while plotted classification point 83 is within bad torque area 27M. Plotted classification points 80, 81, and 82 represent zero classification points being added to point buckets 90-92 as shown in FIGS. 7B, 7C and 7D, respectively.

Plotted classification point 83 represents non-zero classifications points equal to a magnitude of a vector 85" extending from low confidence threshold boundary 25L to plotted classification point 83 where the non-zero classification points are added to point bucket 90 as shown in FIG. 7E. This addition activates a cautious flag or first level of warning, but again prevents raising of the alarms too rapidly based on torque data in which there is low confidence. The point classification method in FIGS. 6-8, as shown, indicates the use of high confidence threshold boundary 25H being employed for point classification during certain operating conditions provides for a high confidence in a failure prediction of engine 30, while operating conditions that provide for lower confidence in point classification reduces the number of points classified as indicating a potential failure conditions, and therefore improve the quality in failure predictions and reduce the potential for false failure predictions.

The schematic flowchart diagram and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, monitors, or circuits, in order to more particularly emphasize their implementation independence. For example, a module, monitor, or circuit may be implemented as a hardware circuit comprising custom VLSI circuits or gate arrays, off-the-shelf semiconductors such as logic chips, transistors, or other discrete components. A module, monitor, or circuit may also be implemented in programmable hardware devices such as field programmable gate arrays, programmable array logic, programmable logic devices or the like.

Modules, monitors and circuits may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified module, monitor, or circuit need not be physically located together, but may comprise disparate instructions stored in different locations which, when joined logically together, comprise the module, monitor, or circuit and achieve the stated purpose for the module.

For example, a module of computer readable program code may be a single instruction, or many instructions, and may even be distributed over several different code segments, among different programs, and across several memory devices. Similarly, operational data may be identified and illustrated herein within a module, monitor, or circuit, and may be embodied in any suitable form and organized within any suitable type of data structure. The operational data may be collected as a single data set, or may be distributed over different locations including over different storage devices, and may exist, at least partially, merely as electronic signals on a system or network. Where a module, monitor, or circuit or portions thereof are implemented in machine-readable medium (or computer-readable medium), the computer readable program code may be stored and/or propagated on one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Various aspects of the present disclosure are contemplated. According to one aspect, a method includes determining a commanded torque and a measured torque of an engine; determining a torque error in response to a differential between the commanded torque and the measured torque, and determining a slope error in response to a differential between a rate of change of the commanded torque and a rate of change of the measured torque; defining a baseline error space based on a learned torque error and a learned slope error and establishing a baseline threshold boundary within the baseline error space based on a monitoring confidence level, the baseline threshold boundary dividing the baseline error space into a first torque area below the baseline threshold boundary and a second torque area above the baseline threshold boundary; and classifying torque data from the engine in the first torque area and the second torque area based on the torque error and the slope error, wherein the torque data classified in the second torque area is indicative of an engine friction condition.

In one embodiment, the method includes predicting a failure of the engine based on the classified torque data. In a refinement of this embodiment, the method includes derating the engine in response to the failure prediction.

In another embodiment, classifying the torque data includes placing the torque data in the second torque area in one of a plurality of classification point buckets based on a magnitude of the torque error in the second torque area relative to the baseline threshold boundary. In a refinement of this embodiment, the plurality of classification point buckets represent escalating indicators for a failure prediction of the engine.

In yet another embodiment, defining the baseline error space includes learning a nominal error space having a nominal threshold boundary based on the learned torque error and the learned slope error. In a refinement of this embodiment, establishing the baseline threshold boundary includes modifying the nominal threshold boundary by weighting torque data over time that is classified in the second torque area.

According to another aspect of the present disclosure, a system for monitoring engine friction includes an engine control module for operably controlling an engine and an engine friction monitor. The engine control module is configured to determine a commanded torque to the engine and a measured torque from the engine. The engine friction monitor that is configured to determine a torque error in response to a differential between the commanded torque and the measured torque and determine a slope error in response to a differential between a rate of change of the commanded torque and a rate of change of the measured torque. The engine friction monitor is also configured to establish a baseline threshold boundary based on a learned torque error, a learned slope error, and a monitoring confidence level. The baseline threshold boundary divides a baseline error space into a first torque area below the baseline threshold boundary and a second torque area above the baseline threshold boundary. The engine friction monitor also is configured to classify torque data from the engine into one of the first torque area and the second torque area based on the torque error and the slope error.

In one embodiment, the engine friction monitor outputs a failure prediction monitor to the engine control module based on the classified torque data, and the torque data classified in the second torque area is indicative of an engine friction condition. In a refinement of this embodiment, the engine control module is configured to derate the engine in response to the failure prediction.

In another embodiment, the engine friction monitor is configured to classify the torque data by placing the torque data in the second torque area in one of a plurality of classification point buckets based on a magnitude of the torque error in the second torque area relative to the baseline threshold boundary. In a refinement of this embodiment, the classification point buckets represent escalating indicators for a failure prediction of the engine.

In yet another embodiment, the engine friction monitor is configured to modify the baseline threshold boundary by weighting torque data over time that is classified in the second torque area. In another embodiment, the system includes a monitor enabler that is in communication with the engine friction monitor that is configured to enable engine friction monitoring in response to one or more enablement conditions being present.

According to another aspect of the present disclosure an engine friction monitoring apparatus includes a torque baseliner, an error calculator, and a torque classifier. The torque baseliner is configured to intermittently derive a monitoring confidence level from a commanded torque of an engine and a measured torque of the engine. The monitoring confidence level is based on an operational status of an engine as indicated by the commanded torque and the measured torque. The torque baseliner is further configured to intermittently derive a feedback target from the commanded torque and the measured torque. The error calculator is configured to intermittently derive a torque error and a slope error in response to the feedback target. The torque error is a differential between the commanded torque and the measured torque, and the slope error is a differential between a rate of change of the commanded torque and a rate of change of the measured torque. The torque classifier is configured to establish a monitoring threshold boundary within a monitoring error space in response to the monitoring confidence level. The monitoring threshold boundary divides the monitoring error space into a first torque area below the monitoring threshold boundary and a second torque area above the monitoring threshold boundary. The torque classifier is further configured to classify points of torque data in one of the first and second torque areas based on the torque error and the slope error.

In one embodiment, the apparatus includes a failure predictor configured to predict an impending engine failure from an accumulation of points classified in the second torque area. In another embodiment, the torque baseliner selects the monitoring confidence level between a first confidence level and a second confidence level that is lower than the first confidence level in response to engine operating conditions.

In a further embodiment, the apparatus includes an engine control module configured to derate the engine in response an output from the torque classifier. In a refinement of this embodiment, the apparatus includes a torque signal processor that receives the commanded torque and the measured torque from the engine control module. The torque signal processor is configured to apply a transient filter to the commanded torque and the measured torque that is provided to the torque baseliner. In another refinement of this embodiment, the apparatus includes a monitor enabler in communication with the engine control module that is configured to enable engine friction monitoring in response to one or more enablement conditions being present.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining, by an engine control module, a commanded torque and a measured torque of an engine;
   determining, by an engine friction monitor, a torque error in response to a differential between the commanded torque and the measured torque, and determining, by the engine friction monitor, a slope error in response to a differential between a rate of change of the commanded torque and a rate of change of the measured torque;
   defining, by the engine friction monitor, a baseline error space based on a learned torque error and a learned slope error and establishing, by the engine friction monitor, a baseline threshold boundary within the baseline error space based on a monitoring confidence level, the baseline threshold boundary dividing the baseline error space into a first torque area below the baseline threshold boundary and a second torque area above the baseline threshold boundary; and
   classifying, by the engine friction monitor, torque data from the engine in the first torque area and the second torque area based on the torque error and the slope error, wherein the torque data classified in the second torque area is indicative of an engine friction condition.

2. The method of claim 1, further comprising predicting, by the engine friction monitor, a failure of the engine based on the classified torque data.

3. The method of claim 2, further comprising derating, by the engine control module, the engine in response to the failure prediction.

4. The method of claim 1, wherein classifying the torque data includes placing the torque data in the second torque area in one of a plurality of classification point buckets based on a magnitude of the torque error in the second torque area relative to the baseline threshold boundary.

5. The method of claim 4, wherein the plurality of classification point buckets represent escalating indicators for a failure prediction of the engine.

6. The method of claim 1, wherein defining the baseline error space includes learning a nominal error space having a nominal threshold boundary based on the learned torque error and the learned slope error.

7. The method of claim 6, wherein establishing the baseline threshold boundary includes modifying the nominal threshold boundary by weighting torque data over time that is classified in the second torque area.

8. A system for monitoring engine friction, comprising:
   an engine control module for operably controlling an engine, wherein the engine control module is configured to determine a commanded torque to the engine and a measured torque from the engine;
   an engine friction monitor that is configured to:
      determine a torque error in response to a differential between the commanded torque and the measured torque and determine a slope error in response to a differential between a rate of change of the commanded torque and a rate of change of the measured torque;
      establish a baseline threshold boundary based on a learned torque error, a learned slope error, and a monitoring confidence level, the baseline threshold boundary dividing a baseline error space into a first torque area below the baseline threshold boundary and a second torque area above the baseline threshold boundary; and classify torque data from the engine into one of the first torque area and the second torque area based on the torque error and the slope error.

9. The system of claim 8, wherein the engine friction monitor outputs a failure prediction monitor to the engine control module based on the classified torque data, wherein the torque data classified in the second torque area is indicative of an engine friction condition.

10. The system of claim 9, wherein the engine control module is configured to derate the engine in response to the failure prediction.

11. The system of claim 8, wherein the engine friction monitor is configured to classify the torque data by placing the torque data in the second torque area in one of a plurality of classification point buckets based on a magnitude of the torque error in the second torque area relative to the baseline threshold boundary.

12. The system of claim 11, wherein the classification point buckets represent escalating indicators for a failure prediction of the engine.

13. The system of claim 8, wherein the engine friction monitor is configured to modify the baseline threshold boundary by weighting torque data over time that is classified in the second torque area.

14. The system of claim 8, further comprising a monitor enabler that is in communication with the engine friction monitor that is configured to enable engine friction monitoring in response to one or more enablement conditions being present.

15. An engine friction monitoring apparatus, comprising:
an engine friction monitor in communication with an engine control module that operably controls an engine, wherein the engine control module is configured to determine a commanded torque to the engine and a measured torque from the engine, wherein the engine friction monitor includes:
a torque baseliner configured to intermittently derive a monitoring confidence level from the commanded torque of the engine and the measured torque of the engine, the monitoring confidence level being based on an operational status of the engine as indicated by the commanded torque and the measured torque, and wherein the torque baseliner is further configured to intermittently derive a feedback target from the commanded torque and the measured torque;
an error calculator configured to intermittently derive a torque error and a slope error in response to the feedback target, the torque error being a differential between the commanded torque and the measured torque, the slope error being a differential between a rate of change of the commanded torque and a rate of change of the measured torque; and
a torque classifier configured to establish a monitoring threshold boundary within a monitoring error space in response to the monitoring confidence level, the monitoring threshold boundary dividing the monitoring error space into a first torque area below the monitoring threshold boundary and a second torque area above the monitoring threshold boundary, and wherein the torque classifier is further configured to classify points of torque data in one of the first and second torque areas based on the torque error and the slope error.

16. The apparatus of claim 15, further comprising a failure predictor configured to predict an impending engine failure from an accumulation of points classified in the second torque area.

17. The apparatus of claim 15, wherein the torque baseliner selects the monitoring confidence level between a first confidence level and a second confidence level that is lower than the first confidence level in response to engine operating conditions.

18. The apparatus of claim 15, wherein the engine control module is configured to derate the engine in response an output from the torque classifier.

19. The apparatus of claim 18, further comprising a torque signal processor that receives the commanded torque and the measured torque from the engine control module, and the torque signal processor is configured to apply a transient filter to the commanded torque and the measured torque that is provided to the torque baseliner.

20. The apparatus of claim 18, further comprising a monitor enabler in communication with the engine control module that is configured to enable engine friction monitoring in response to one or more enablement conditions being present.

* * * * *